United States Patent
Cosatto et al.

[11] Patent Number: 5,995,119
[45] Date of Patent: Nov. 30, 1999

[54] METHOD FOR GENERATING PHOTO-REALISTIC ANIMATED CHARACTERS

[75] Inventors: Eric Cosatto, Highlands; Hans Peter Graf, Lincroft, both of N.J.

[73] Assignee: AT&T Corp., New York, N.Y.

[21] Appl. No.: 08/869,531

[22] Filed: Jun. 6, 1997

[51] Int. Cl.$^6$ ........................................... G06F 3/14
[52] U.S. Cl. ................................................. 345/473
[58] Field of Search .................................. 345/419, 435, 345/473, 474

[56] References Cited

U.S. PATENT DOCUMENTS

4,888,713  12/1989  Falk ............................................. 345/425
5,375,195  12/1994  Johnston ...................................... 345/435
5,630,017   5/1997  Gasper et al. .............................. 345/473

*Primary Examiner*—Phu K. Nguyen
*Assistant Examiner*—Cliff N. Vo

[57] ABSTRACT

A method for generating photo-realistic characters wherein one or more pictures of an individual are decomposed into a plurality of parameterized facial parts. The facial parts are stored in memory. To create animated frames, the individual facial parts are recalled from memory in a defined manner and overlaid onto a base face to form a whole face, which, in turn, may be overlaid onto a background image to form an animated frame.

41 Claims, 6 Drawing Sheets

METHOD FOR GENERATING PHOTO-REALISTIC ANIMATED CHARACTERS

FIELD OF THE INVENTION

This invention relates to the field of animation, and more particularly, to techniques for generating photo-realistic animated faces in computer and communications applications and other high-tech operations.

BACKGROUND OF THE INVENTION

In a modern technological era characterized by complex computer interfaces and by sophisticated video and communications devices, techniques which promote consumer interest in high-tech equipment have become increasingly prevalent. The computer industry, with an eye toward drawing consumers into the mainstream of its technological innovations, regularly seeks new methods by which consumers can interface with devices that exhibit more user-friendly or humanlike qualities. In addition to increasing the appeal of technology to the average, non-technical consumer, such methods raise the potential for generating a host of new and useful computer and video applications.

In recent years, the prospect of using animated, talking faces in various high-tech operations has become particularly enticing. Animated techniques can be used for a diverse array of applications. The addition of talking faces to computer-user interfaces, for instance, can enhance the computer's user-friendliness, promote user familiarity with computers, and increase computer entertainment value. Generating animated agents in computer-user interfaces would be useful, among other applications, for performing such tasks as reading E-mail, making announcements, or guiding a user through an application. The use of lifelike, synthesized characters would also be valuable in any application where avatars (visual representations of persons) are used. Such applications could include virtual meeting rooms, multi-user video games, lectures, seminars, security or access devices, scenarios requiring human instructions, and a host of other operations.

Industry practitioners are also considering model-based coding for video telephony over low data-rate connections. This application would entail generating synthesized faces or characters at the receiver station, whereby the form and structure of the images are governed by parameters originating at the transmitting station.

Regardless of the particular application, the synthesis of human faces ideally involves the use of lifelike, natural-looking ("photo-realistic") characters. Using photo-realistic characters has many benefits. They have a greater entertainment value over that of simple animated characters. Furthermore, using photo-realistic characters as part of a human interface adds a realistic element to a computer. Consumers otherwise intimidated by computer technology might feel more comfortable using a computer which has a humanlike interface. As another illustration, the use of a photo-realistic character to give an office presentation can create a more favorable impression on the presentation's attendees than if simple animated characters were used—with simple animation, the characters cannot concurrently speak while eliciting realistic facial and mouth movements typical of a person making speech. Photo-realistic characters can convey meaningful and realistic facial expressions. Simple animation, in contrast, is cartoon-like and unimpressive, particularly in an arena such as a corporate meeting.

Photo-realistic characters can also be used as an icon in a virtual reality application. Such characters can further be used over such media as the Internet, wherein the bandwidth of the media is otherwise too small to accommodate high-frequency video signals. Using photo-realistic techniques, human characters with realistic movements can be transmitted over the Internet in lieu of video.

Practitioners have made numerous efforts to synthesize photo-realistic characters. One problem common to most of these methods is their inability to make characters appear sufficiently humanlike. The remaining methods that can, at least in theory, generate more realistic-looking characters require prohibitively large computer memory allocations and processing times to accomplish this goal. The utility of such methods is consequently restricted to high-capacity media.

Thus, an important but previously unrealized goal of practitioners is to disclose a technique for generating photo-realistic faces which requires a minimal amount of computation for the synthesis of animated sequences. Naturally, the least computation would be required in the case where all parts and their corresponding bitmaps are produced in advance and stored in a library. The synthesis of a face would then involve merely overlaying the parts. Modern graphics processors have become so powerful, however, that warping pictures to generate animated shapes may be performed In real-time. In this event, only the control points need be stored in the library, which substantially reduces the memory required for storing the model.

The approaches employed by practitioners generally fall into four categories: (1) three-dimensional ("3-D") modeling techniques; (2) warping and morphing techniques; (3) interpolation between views; and (4) flip-book techniques. These approaches are described below.

(1) Three Dimensional Modeling

Practitioners have developed 3-D models for creating talking heads and faces. Many 3-D modeling techniques use generic mesh models over which pictures of persons are texture-mapped. Generally, the physical structure, such as bone and muscle structure, is designed with great precision and detail to derive the shape of the face. While 3-D modeling is useful for certain applications, the technique is fraught with disadvantages when deployed in the framework of a character making speech. Such methods require extensive computer processing and consume substantial memory; consequently, they are not suitable for real-time applications on a personal computer. Moreover, facial motions created by standard 3-D models typically seem "robot-like" and do not appear natural.

(2) Warping Or Morphing

Other techniques for generating animated characters are based on warping or morphing of two-dimensional ("2-D") images of faces. Warping can be generally defined as the intentional distortion of an image in a predefined manner. Warping can be used, inter alia, to create expressions on a face by distorting a face with a neutral expression (e.g., to create a frown).

Morphing is the transformation of one image into another image using interpolation and/or distortion. Unlike warping, which simply distorts an image in a predefined manner, morphing typically uses two sets of fixed parameters comprising an initial image and a target image. Various commercial products utilize warping or morphing techniques, including certain toys which enable children to produce funny, animated sequences of faces.

One disadvantage of using warping or morphing in isolation is the inability of these techniques to provide realistic, natural-looking facial movements. Another disadvantage is that the morphing process is possible only between predefined pairs of images. Thus this technique is not suitable for generating models that must produce unforeseen motions, such as when previously unknown text is designated to be spoken.

(3) Interpolation Between Reference Views

Researchers have accordingly sought to resolve shortcomings of existing morphing methods. To accommodate the possibility of extemporaneously generating previously unknown facial motions, researchers have developed techniques to automatically determine morphing parameters. These techniques begin with a set of reference views wherein new views are automatically generated by performing interpolation between the reference views. Researchers have demonstrated sequences of rotating and tilting heads using this interpolation method. However, no sequences of a talking head have been synthesized, in part because the act of speaking generates transient facial features such as grooves and wrinkles that are impossible to duplicate using mere interpolation. Talking also exposes areas not generally seen in the reference frames, such as teeth. Elements like teeth which are not present in the reference frames cannot be generated using interpolation.

(4) Flip-Book Technique

The flip-book technique, probably the oldest of all animation techniques, involves the process of storing all possible expressions of a face in a memory. Individual expressions are later recalled from the memory to generate a sequence of expressions. The use of this technique has severe practical limitations. For example, making available an adequate number of expressions and mouth shapes requires generating and storing into memory a tremendous number of frames. As such, the flexibility of the flip-book approach is significantly curtailed, since only facial expressions generated ahead of time are available for animation. Thus, among other problems, the flip-book approach is not suitable for use on a personal computer which typically possesses nontrivial limitations with respect to memory size and processing power.

In sum, the present techniques for synthesizing animated faces possess at least the following disadvantages: (1) the characters portrayed are not sufficiently lifelike or natural-looking, especially when speaking; (2) the methods require a considerable, often infeasible, computer memory allocation and processing time; (3) the characters are frequently incapable of spontaneously uttering words not previously known; (4) the methods lack variety in the possible available facial expressions; (5) many of the methods lack the ability to present various important character features, facial or otherwise; and (6) many of the methods lack coarticulation or conflict resolution techniques.

Accordingly, it is an object of the invention to disclose a technique for generating lifelike, natural-looking, photo-realistic faces and characters which avoids the complexities of 3-D modeling and which requires less memory and computer-processing power than conventional methods.

Another object of the invention is to disclose such a method which is capable of generating lifelike facial movements to accommodate concurrent speech, including speech comprising previously unknown text.

Another object of the invention is to disclose a method which is capable of being executed in a real-time application, including an application on a personal computer.

Another object of the invention is to disclose a method which provides for a wide variety of possible facial features and expressions.

SUMMARY OF THE INVENTION

The present invention comprises a method for creating photo-realistic, animated faces and characters, such as human and animal faces and characters, which are capable of talking and expressing emotions. The model upon which the method relies is based on one or more pictures of an individual. These pictures are decomposed into a hierarchy of parameterized structures and stored in a model library. For the syntheses of faces, the proper parts are loaded from the model library and overlaid onto a base face to form a whole face with the desired expression.

To synthesize a wide range of facial expressions, each face part is parameterized using control points stored in memory. These parameterized face parts comprise shapes which cover possible deformations which can be undergone by the face part when executing different actions such as smiling, frowning, articulating a phoneme, etc.

In a preferred embodiment, the head model is combined with a speech synthesizer from which the model derives the sequence and duration of phonemes to be spoken. The parameters for the face parts are computed from the phoneme sequence.

Also, in a preferred embodiment, coarticulation effects are computed as a portion of the computations for one or more face parts. Conflicts are preferably resolved between the requirements for expressing emotion and for saying a phoneme. A version of each face part matching the desired values is thereupon generated from the library for the synthesis of the whole face.

Further features of the invention, its nature and various advantages, will be more apparent from the accompanying drawings and the following description of the preferred embodiments.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIGS. 2a and 2b, collectively FIG. 2, shows a method of parameterizing face parts in accordance with a preferred embodiment of the invention.

DESCRIPTION OF THE PREFERRED EMBODIMENTS

The method according to the present invention is well-suited, among other operations, for virtually any application involving reading text or giving a speech to a user or other person. While the invention can be fully understood from the following explanation of its use in the context of human faces and characters, the invention is intended to be equally applicable to the use of animal faces and characters. In a preferred embodiment, the technique according to the invention comprises four groups of elements:

(1) base face: a picture of a face which is used as a background for the animated sequence. Typically, although not necessarily, the base face contains a neutral expression and a closed mouth.

(2) parameterized facial parts ("PFPs"): individual facial parts which are overlaid onto the base face during the course of the animation sequence. Preferably, PFPs comprise the mouth, eyes, nose, cheeks, chin, forehead, teeth, tongue, and mouth cavity.

(3) parameterized facial parts with hair ("PFPHs"): individual facial parts with hair which are overlaid onto the base face during the course of the animation sequence. Preferably, PFPHs comprise the hair, eyebrows, moustache, beard, and side burns.

(4) secondary effects: additional features which may be used during the animation sequence. These may include, for example, grooves, wrinkles, and highlights. These four groups of elements are described in greater detail below in the context of various preferred embodiments of the invention.

(1) Base Face

The base face is a picture of the whole face onto which parts are overlaid for the animation sequence. The use of a base face in an animation sequence can save computer processing time and reduce memory requirements. This is because for many expressions, only a particular section of the base face need be changed; all other sections can remain undisturbed.

If a facial image contains pronounced wrinkles and grooves, these are preferably removed before using the image as a base face. Such a removal procedure may be necessary to avoid interference with wrinkles and grooves added during the course of the animation sequence.

(2) Parameterized Facial Parts ("PFP")

The PFPs are the individual elements that are overlaid onto the base face to comprise the image of the whole face for an animated frame. The features of PFPs are defined by one or more parameters. Illustrations of parameters include shape and depth. The parameters of each PFP are stored as control points in a memory. In a preferred embodiment, a PFP is represented by one or more rectangular bitmaps, with each bitmap comprising a set of parameters and a mask. In this embodiment, the control points are positioned on the bitmap. A bitmap may be used, for example, to represent a PFP with a distinct shape. A related basemap may contain the actual pixels of the picture to be displayed.

The mask defines the transparency of each pixel comprising the image. Thus, the mask may describe which part inside the bounding box is visible and how the transparency gradually increases at the borders to merge the PFP with the background.

Figure 1:
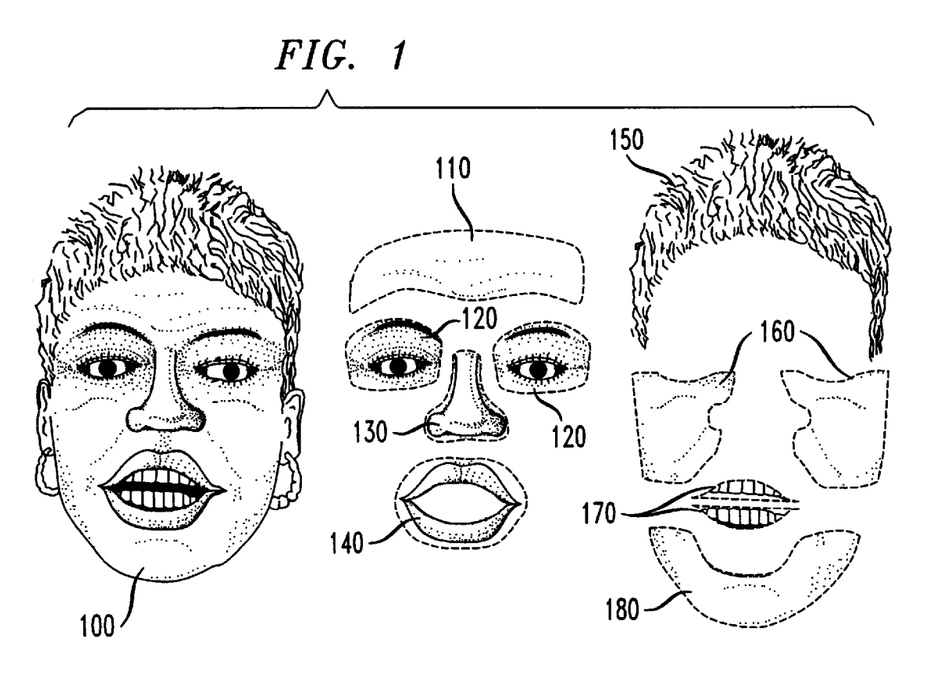
FIG. 1 shows the decomposition of a face into parameterized parts according to the method of the present invention.

Examples of PFPs, and how they relate to a whole face are shown in FIG. 1. (The procedure by which PFPs are parameterized is explained in greater detail in FIG. 3.) FIG. 1 shows a face which has been decomposed into PFPs. In this illustration, the picture 100 of the whole face is divided into the following parts: forehead 110, eyes 120, nose 130, mouth 140, hair 150, cheeks 160, teeth 170, and chin 180. The forehead 110 has been retouched to remove hair. All other parts are left in their original state.

In a preferred embodiment, parameters stored with each PFP include at least its width and height, and additional parameters defining how to place the part onto the image. As an illustration, for a mouth, points corresponding to the edges of the upper and lower teeth may be used to define the mouth's placement (see FIG. 2).

Other parameters may be used to define the outline of a face part and the outline of other prominent features. The inventors presently prefer outlines encoded with splines. A spline generally uses a piecewise function approximation of the outline, such as a third-order polynomial. This polynomial function describes the outline between two control points. A second polynomial function describes the outline between the next two points, and so on. For the mouth, the contours of the lips may be encoded in this manner. For the eyes, the outline of the shape, the contour of the eye opening, and the upper edge of the eye lid may be encoded.

Another parameter which can be useful is the depth of the PFP, i.e., the position of the PFP on the axis perpendicular to the bitmap relative to the other PFPs. Using this parameter, the PFP can take the 3-D structure of the face into account. Thus the present invention can incorporate various assets of 3-D modeling without the associated liabilities of increased memory allocation and processing time.

For each PFP, several bitmaps may be stored, with each bitmap comprising a representation of the PFP in a different shape. The different shapes of the PFP can, in turn, be obtained by decomposing separate pictures of the face in a process called photographic extraction. Each of these pictures may have a different expression, and the individual PFPs unique to that expression can be extracted and stored in memory as one or more bitmaps. Alternatively, or in addition to this method, the shapes of the PFPs may be produced by other methods of decomposition: warping and/or morphing from key shapes. The preferred methods for decomposing pictures to obtain PFPs are explained more fully below.

Figure 2A:
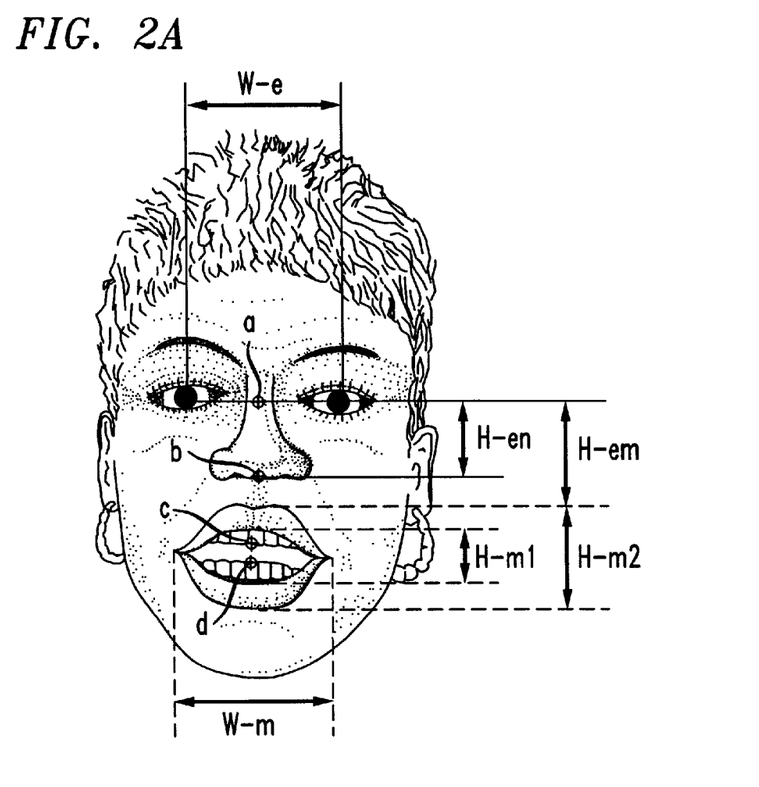
Figure 2B:
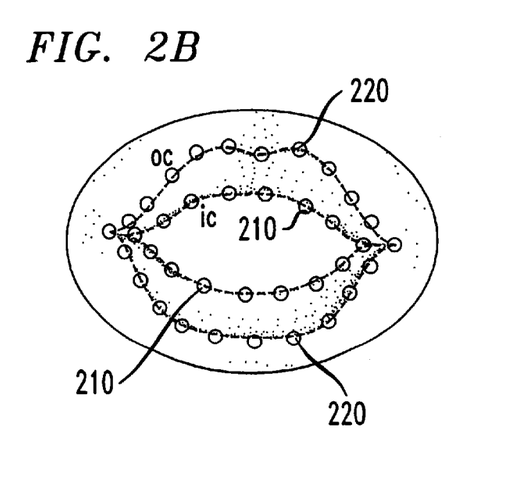

An example of the parameterization of a face part is shown in FIG. 2. The image 200 comprising FIG. 2a illustrates the parameters of the mouth used to place it and to define its appearance. These parameters are inside height (H-m1), outside height (H-m2), and width (W-m). The point c comprises the lower edge of the upper teeth, and the point d comprises the upper edge of the lower teeth. The points c and d are used to position the mouth onto the image. The placement of the mouth is performed relative to the points a (center between eyes) and b (center between nostrils). In this illustration, all distances are normalized to the eye separation (W-e). Eye-nose (H-en) and eye-mouth (H-em) distances are used to estimate the head tilt. FIG. 2b shows the lip contours 210, which comprise the curves describing the inner contours of the lips (ic), the outer contour (oc), and the shape, or border, of the part. Marked on the lip contours 210 are control points 220 defining the deformation in a warping or morphing operation. As in this example, warping or morphing may be used to manipulate individual PFPs.

As described above, PFPs may be generated by decomposing pictures of a face. One embodiment of this decomposition method is called photographic extraction. Photographed parts provide a good base for generating animated sequences which closely resemble the photographed person. To generate the shapes, a person may be asked to speak a phoneme or to express an emotion. From such pictures the shapes are simply cut out, and scanned or otherwise placed into memory.

Two additional considerations are important to the process of photographic extraction. First, the total number of frames required to cover all possible shapes for a given animation sequence may be large. Second, while the quality of the individual frames synthesized using this photographic extraction method tends to be high, the practitioner must ensure that the individual features look natural in the context of the whole facial expression. This latter consideration is related to the action of the person being photographed. Specifically, when a person purposefully expresses an emotion or speaks a phoneme in isolation, he or she tends to exaggerate the articulation. Thus a photographed shape is often not immediately appropriate for animation.

For these reasons, pictures generated via photographic extraction usually are insufficient to create a complete set of shapes for a particular application (i.e., a set where all possible shapes to be encountered in an animation sequence have been produced). These pictures are nevertheless an important part of the process for generating a complete set of shapes. Additional shapes may be produced by using morphing, warping, and/or interpolation techniques. Using morphing and/or interpolation, all shapes which are intermediate to a neutral expression and an exaggerated one may be generated. Among these intermediate images, several may be suitable for animation.

In another embodiment, warping alone may be used as the decomposition method to create the library of PFPs. Here, animated frames are produced by generating all necessary shapes from a single shape. Generating facial parts by warping entails (1) referencing the control points in memory which define an original facial shape; (2) adjusting those control points into new control points which define the new deformed shape; and (3) recording the new control points in memory for the new shape. Not surprisingly, this method generally requires a detailed understanding of how a facial part deforms.

Once a library of individual shapes are created by warping, they may advantageously be used in any number of images of photo-realistic persons since facial parts are individually parameterized. By dictating the new control points, the splines describing the feature shapes may be easily adapted to take into account the characteristics of a different person (e.g., width of the face, thickness of the lips, etc.).

While the final photo-realistic person created using facial parts derived by warping may not be exactly like how the person really looks, the warping suffices to create a reasonably realistic representation. Moreover, warping is fast and convenient, since a single picture of a person may be used to generate all of the animated frames.

The process of generating images of the mouth is probably the most complex of all facial features. This is particularly true where the photo-realistic person is speaking. Indeed, the mouth shows the widest variations of all PFPs. In a talking face, it is also the feature to which the observer is most attentive. Human beings are sensitive to slight irregularities in the shape or motion of the mouth. Hence, the practitioner should ordinarily pay special attention to the animation of the mouth.

A mouth shape articulating a phoneme is often referred to as a viseme. While over fifty spoken visemes are distinguished in the English language, most researchers consider between ten and twenty different visemes to be sufficient to use in an animated sequence. The number of visemes, of course, will vary depending on the application. In a preferred embodiment of the invention, twelve principle visemes are employed, namely: a, e, ee, o, u, f, k, l, m, t, w, mouth-closed. All other possible phonemes are mapped onto this set of twelve.

Figure 3:
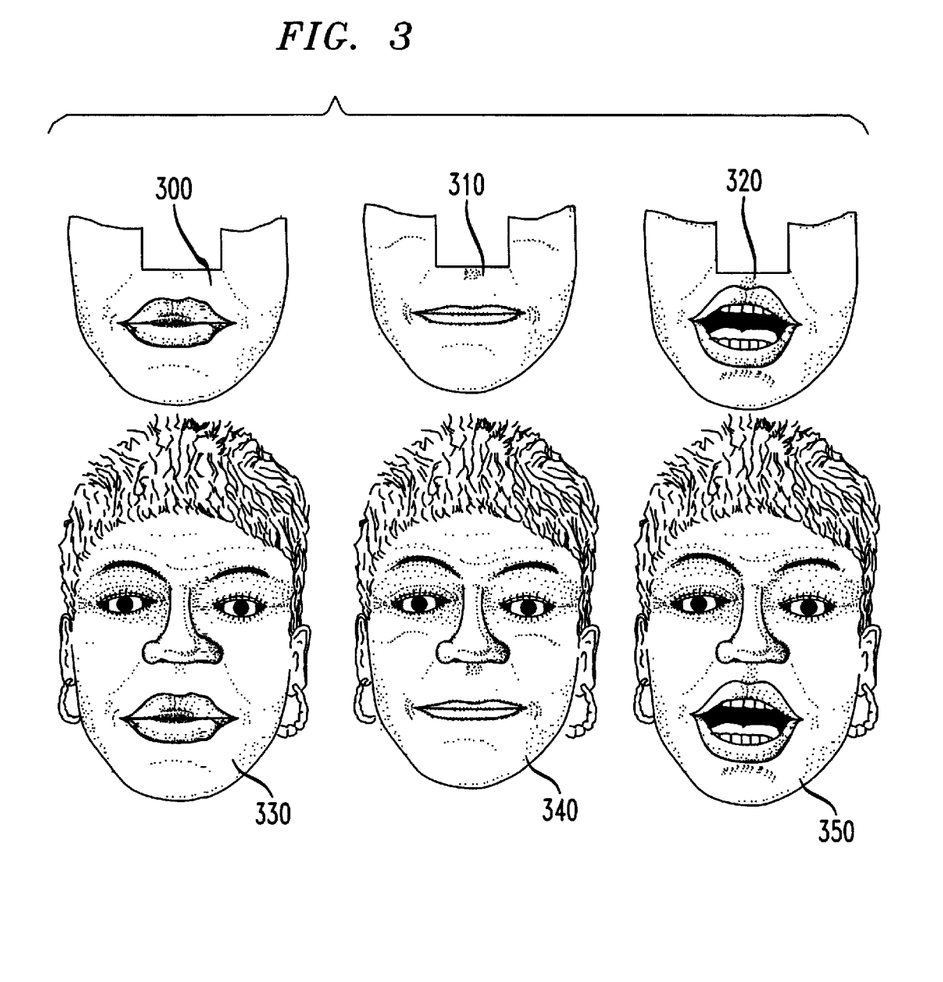
FIG. 3 shows three visemes generated from photographs, in accordance with a preferred embodiment of the invention.
Figure 4:
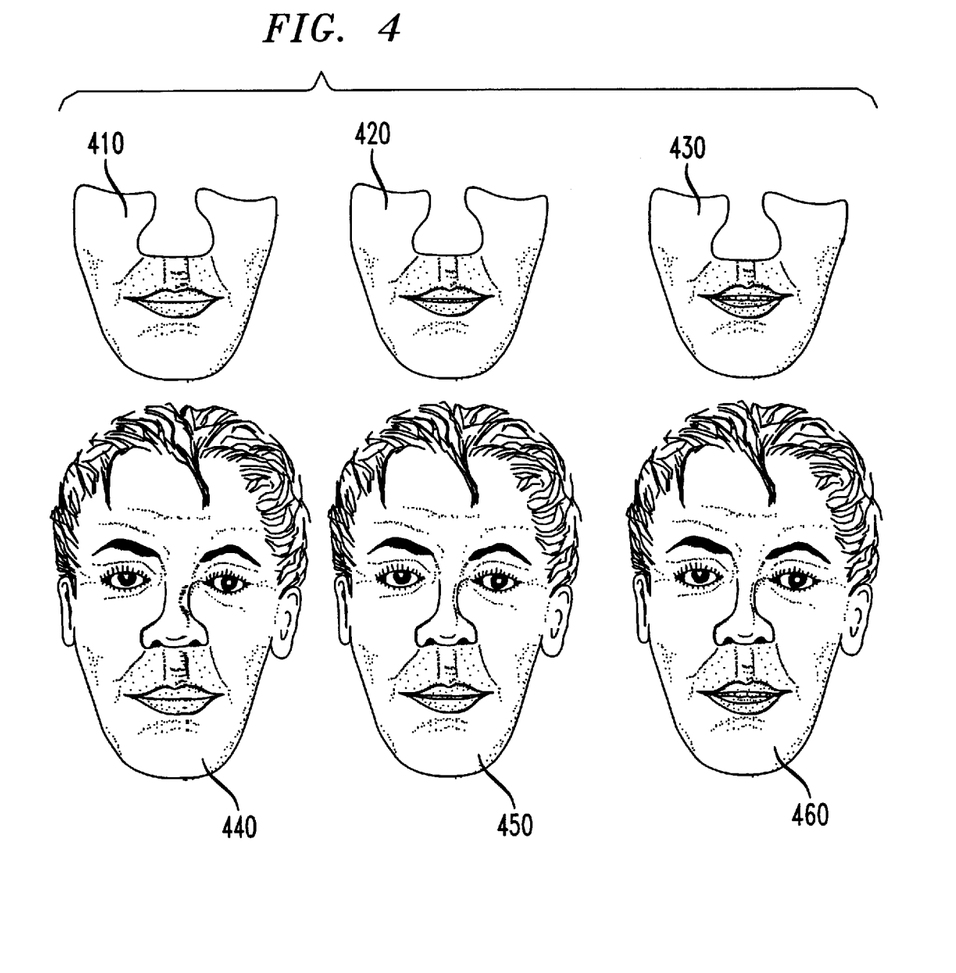
FIG. 4 shows three visemes generated by warping, in accordance with a preferred embodiment of the invention.

FIGS. 3 and 4 show examples of visemes, generated using the two techniques described above. The visemes in FIG. 3 are cut out from two separate pictures. In FIG. 3, the mouth area 300 was cut out from a photograph of the person speaking the phoneme "u". Similarly, the areas 310 and 320 were cut out from photographs of the person speaking the phonemes "m" and "a", respectively. The bottom row shows the three visemes overlaid onto the base face. The resulting face was then placed onto a background to form frames 330, 340, and 350. The lady in FIG. 3 was speaking the phonemes in isolation; as such, they appear strongly articulated.

The visemes in FIG. 4 are generated by warping from a single picture. Thus, a picture of the person was photographed, and from this picture all visemes and other expressions were generated by warping. Visemes 410, 420, and 430 were generated using the phonemes "u", "m", and "a", respectively. The bottom row shows the three frames 440, 450, and 460 with visemes 410, 420, 430 overlaid onto the base face together with variations of the eyes and eyebrows.

Judging these individual frames, most people would consider the appearance of the faces in FIG. 3 more natural than those in FIG. 4. Yet, when the visemes of FIG. 3 are used for animation, the result is a jerky, exaggerated motion of the mouth that looks unnatural. The much less pronounced articulation produced with the visemes of FIG. 4 is perceived as more resembling a real person. This observation highlights the significance of designing the motion rather than solely concentrating on the appearance of the individual frames. For this reason, it is preferable to generate two or three versions of each viseme, each version representing a different strength of articulation.

In practice, it is possible to achieve truly natural-appearing mouth motion only when coarticulation effects are taken into account. Coarticulation means that the appearance of a mouth shape depends not only on the phoneme produced at the moment, but also on the phonemes preceding and succeeding that phoneme. For instance, when an individual articulates the phrase "boo", the mouth shape for "b" reflects the intention of the individual to say "oo". In short, accounting for articulation generates a smoother mouth animation, which, in turn, avoids unnatural exaggeration of lip motion during the animation sequence.

Accordingly, a preferred embodiment of the invention uses coarticulation. The preferred coarticulation method involves the assignment of a mathematical time constant to the parameters of the mouth. Using this time constant, the present shape of the mouth can be made to influence the manner and extent to which the mouth can deform in the proceeding time interval.

(3) Parameterized Facial Parts With Hair ("PFPH")

The PFPH is a group that comprises all of the parts of the face covered with hair. In a preferred embodiment of the invention, the PFPHs are grouped separately from the PFPs because their deformations are typically processed differently. Standard morphing and warping techniques tend to smear out the characteristic textures of hair, or they deform the textures in ways which look artificial. Filling contours with copied textures usually yields better results for moustaches and beards.

In some embodiments, hair is animated only in a limited manner. If the internal texture of the hair is not recognizable, hair can simply be treated like a smooth surface. For images having very low resolution, this crude modeling may be appropriate. However, if individual bangs of hair or even individual hairs are visible, a more sophisticated approach is preferred. For example, motion may be added to whole bangs of hair by rotating and skewing parts of the hair. In actuality, motion of the hair has a limited significance for a talking head. Therefore, only some random motions need be added to the hair.

The most explicit and deterministic motion of a hairy part in a talking face is that of a moustache. A moustache can be deformed by skewing and by cut-and-paste operations. For example, when the mouth changes from a neutral expression to saying an 'o', the outline of the moustache may be estimated from the shape of the upper lip. Thereupon, the original moustache is bent to follow the upper contour using local skew operations. To the extent that parts of the contour are left blank, neighboring sections may be copied and filled into blank sections.

(4) Secondary Effects

Figure 5:
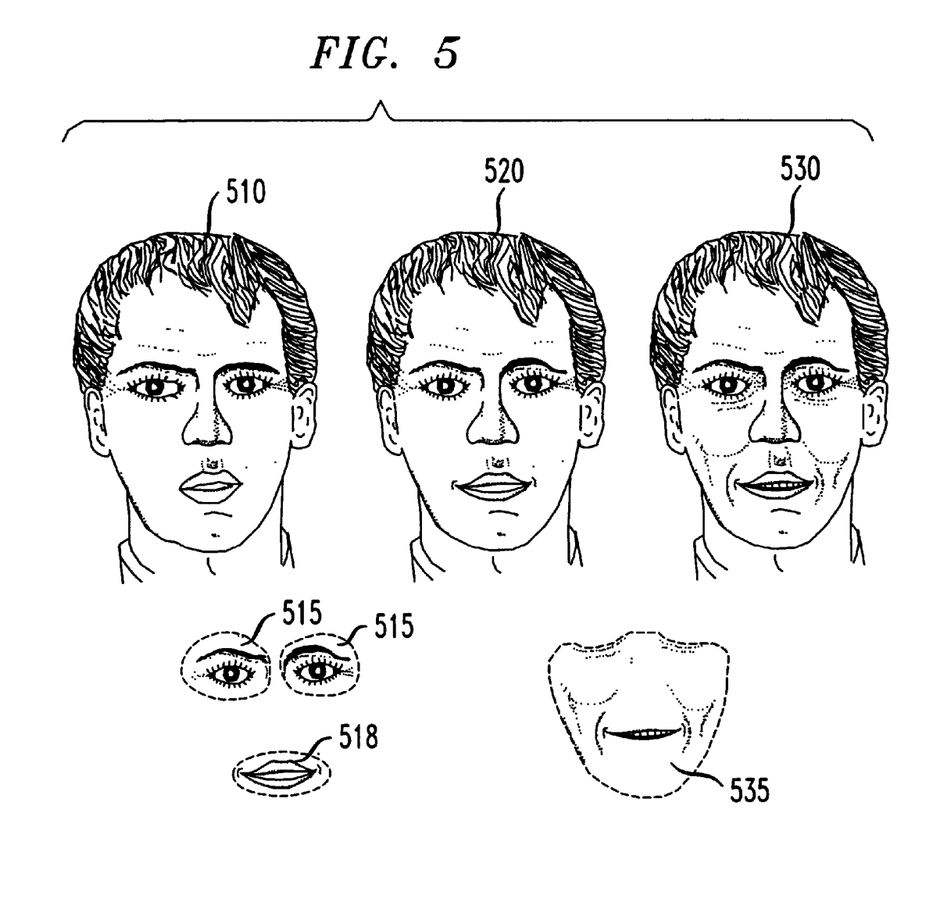
FIG. 5 shows a process of transitioning from a neutral expression to a smile in accordance with a preferred embodiment of the invention.

The generation of realistic-looking images involves additional intricacies. Such intricacies include wrinkles, grooves, and highlights. Extreme deformations, such as a broad smile, are difficult to generate without the addition of grooves. FIG. 5 illustrates the effect of adding grooves to a smile. Rather than generating PFPs with grooves, the grooves are overlaid onto the PFP.

FIG. 5 shows a frame 510 which has a background face and a neutral expression. Frame 520 has the same background face but instead has eyes 515 and mouth 518 overlaid on the background frame. The result of Frame 520 is an unnatural expression. Frame 530 is the same frame as frame 520 except that frame 530 has grooves 535 overlaid onto its base face. The smile of the character in frame 530 looks more natural as a result of the grooves.

Grooves and wrinkles are preferably categorized as a distinct group of the head model because both their syntheses and deformations are treated differently than those of the PFPs. The warping and morphing used to generate the different shapes of the PFP abnormally distort the grooves. Thus, in a preferred embodiment, grooves and wrinkles are instead represented by splines. Splines define the position of the grooves. Adding grooves to a bitmap may be achieved by modulating the color of pixels with a luminance factor. The groove defines the extent of this modulation as well as the gradients in the direction perpendicular to the groove direction.

For the synthesis of a naturally-looking talking head, the motions of all facial parts and of the head must be scrupulously planned. Conversational signals comprise subtle movements of facial parts of the head that punctuate, emphasize, or otherwise regulate speech. For example, a rising eyebrow can be used to accentuate a vowel or to indicate a question. Eye blinks also occur frequently and are usually synchronized with speech flow. Slight head movements also generally accompany speech. When such motions stop, it often means that the speaker has finished and is expecting the listener to take some action. The emotional state of the speaker is also reflected by changes in face parts appearance. For example, eyebrows raised and drawn together may indicate tension or fear.

Figure 6:
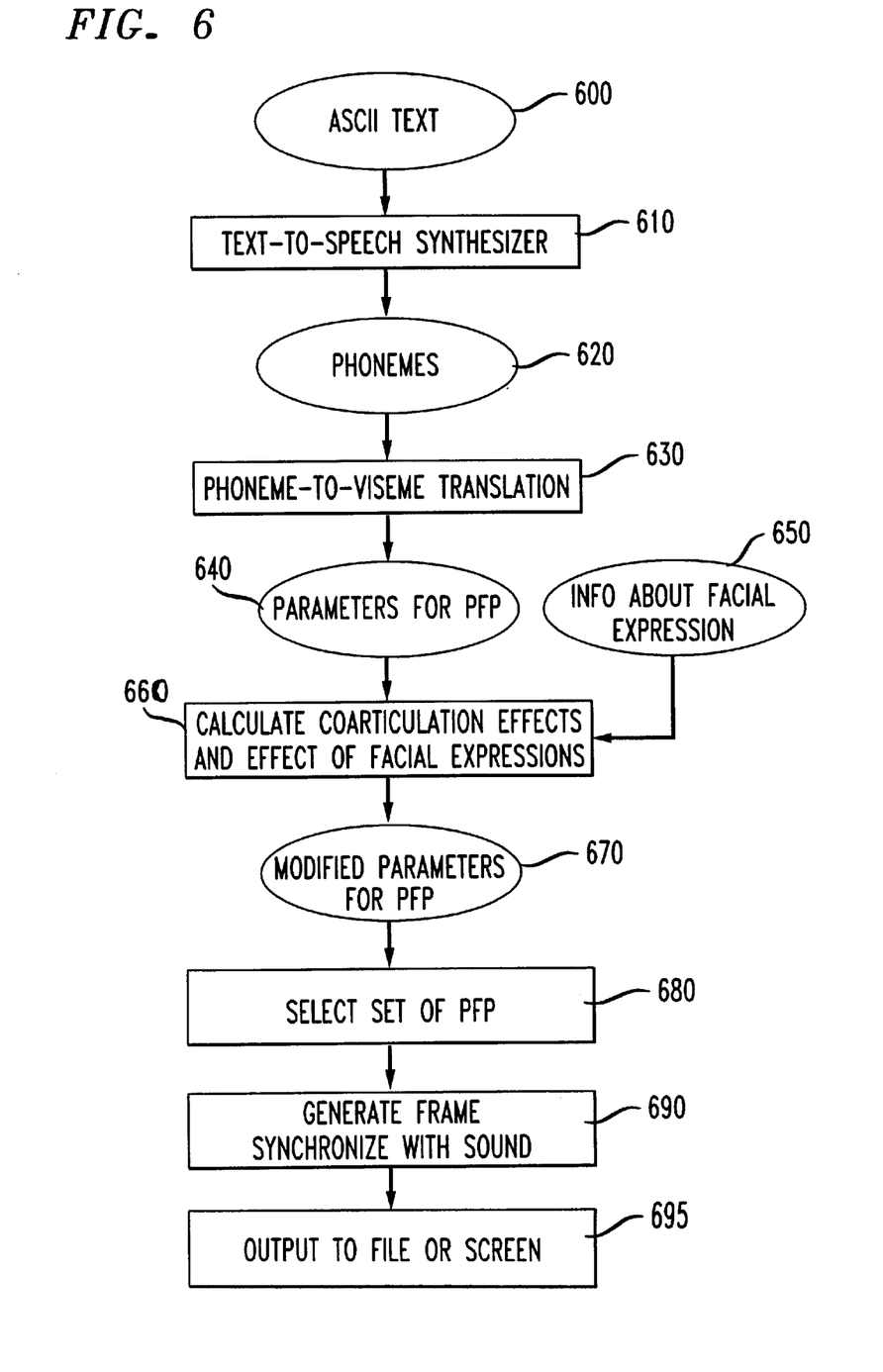
FIG. 6 shows an exemplary flowchart illustrating a synthesis of the animation sequence in accordance with a preferred embodiment of the invention.

One illustration of the synthesis process is shown in FIG. 6. In response to ASCII input comprising the desired words to be spoken (oval 600), a text-to-speech synthesizer (box 610) produces a sequence of phonemes 620, their duration and stress. Each phoneme is mapped to a mouth viseme (box 630). In some embodiments, this mapping can comprise a simple lookup operation such as a table in memory. Once a viseme has been selected, the parameters of the viseme 640 are available for that viseme. These parameters may include, for example, the width and height of the mouth.

The parameters of the viseme may thereupon be entered into a coarticulation module to account for coarticulation effects (box 660). The coarticulation module can also take into account information relating to the desired facial expression (oval 650). As an illustration, if a smile is requested and the viseme calls for a closed mouth, the coarticulation module will increase the mouth width. The output of the coarticulation module is a new set of mouth parameters 670. These modified parameters are next used in the search of the PFP library for the shape with the closest match. The closest-matched PFP is selected (box 680).

The other PFPs are preferably selected using the same process. For those PFPs affected by mouth motion, phoneme information as well as facial expression information is considered. For the eyes and everything above the eyes, only facial expressions need be taken into account since mouth motion does not usually affect these parts.

After the proper visemes have been selected, they are ready to be blended into the base face for the ultimate generation of a frame of the animated sequence (box 690). The frame is synchronized with the corresponding speech. Where the visemes are generated using warping techniques, they will no longer seamlessly blend into the base head. For that reason, the practitioner must perform careful feathering of the alpha-blending mask. In a preferred embodiment, blending is performed first with the parts lying deepest, such as eyes and teeth. Next, the parts lying above are added, and finally, the hair and wrinkles.

Once the head contains all face parts, it can be overlaid onto the background image. Motion of the whole head may then be added. Motion vectors are computed in a semi-random manner, e.g., speech regulates a random blend of predefined motions. A model according to a preferred embodiment includes translating, rotating, and tilting of the head. Rotation of the head around the axis perpendicular to the image plane is readily accomplished. Small rotations around the other two axes may be approximated by simple and fast image warping techniques. The dynamics of the motions must be carefully designed—exaggerated motions appear jerky and unnatural.

The frame is then output to a file or a screen (box 695). In some embodiments, these pixel operations can be performed either into a frame buffer in computer memory or directly into the frame buffer of the screen. At the time of filing this application, the inventors had implemented at least two versions of the invention. One version used the Microsoft AVI API and generated AVI files from an ASCII text input. The other version outputted animation directly onto the screen using the OpenGL graphics library.

Also, at the time of filing this application, the inventors were running an experimental implementation of the head model on a personal computer (PentiumPro 150 MHZ). In this implementation, the synthesizing rate was approximately one frame every 100 milliseconds. The size of the PFP library was 500 Kilobytes. The PFP library contained all visemes for talking and all PFPs for frowning and smiling, happy and neutral expressions. The size of the frames was 360×240 pixels. It should be understood that parameters will vary widely depending on the particular embodiment of the invention. The inventors' experiment was designed for maximum flexibility rather than for ultimate speed or maximum compactness. Further, while the present invention contemplates a wide variety in numerical ranges depending on the state of technology and on the particular application, etc., the inventors estimate that an optimization for speed would permit a synthesis at nearly 30 frames per second and that the library size can be reduced by more than a factor of two. Without using the method according to this invention, the inventors estimate that a library of faces covering the same range of expressions would be more than an order of magnitude larger.

It will be understood that the foregoing is merely illustrative of the principles of the invention, and that various modifications and variations can be made by those skilled in the art without departing from the scope and spirit of the invention. The claims appended hereto are intended to encompass all such modifications and variations.

The invention claimed is:

1. A method for generating an animated image of a photo-realistic face, comprising the steps of
   decomposing one or more pictures of a face into a hierarchy of parameterized facial parts;
   storing the parameterized facial parts into a memory;
   loading, in a designated manner, one or more of the parameterized facial parts from the memory; and
   overlaying the one or more parameterized facial parts onto a base face to form a whole face.

2. The method of claim 1, wherein said loading step and said overlaying step are performed in real-time.

3. The method of claim 1, wherein said decomposing step comprises photographic extraction.

4. The method of claim 3, wherein said photographic extraction step further comprises warping.

5. The method of claim 3, wherein said photographic extraction step further comprises morphing.

6. The method of claim 3, wherein said photographic extraction step further comprises interpolation between reference views.

7. The method of claim 1, wherein said decomposing step comprises warping.

8. The method of claim 1, wherein the parameterized facial parts comprise parameters in memory.

9. The method of claim 8, wherein the parameters for each parameterized facial part comprise control points positioned on a bitmap.

10. The method of claim 1, wherein said overlaying step further comprises the step of:
    overlaying the whole face with one or more secondary effects.

11. The method of claim 1, wherein the parameterized facial parts comprise a mouth, eyes, a nose, cheeks, a chin, a forehead, teeth, a tongue, and a mouth cavity.

12. The method of claim 1, further comprising the step of:
    overlaying the whole face onto a background image to form a frame; and
    outputting the frame to a screen.

13. The method of claim 12, wherein said loading step, both overlaying steps, and said outputting step are performed in real-time.

14. A method for generating animated frames of photo-realistic characters, comprising the steps of
    decomposing one or more pictures of a face into a group of parameterized facial parts;
    storing the group of parameterized facial parts into a model library;
    overlaying designated parameterized facial parts of the group onto a base face to form a whole face; and
    overlaying the whole face onto a background image to form an animated frame.

15. The method of claim 14, wherein both overlaying steps are performed in real-time on a computer.

16. The method of claim 14, wherein the designated parameterized facial parts of the group are selected based on a designated viseme.

17. The method of claim 14, wherein said decomposing step comprises photographic extraction.

18. The method of claim 14, wherein said decomposing step comprises warping.

19. The method of claim 14, wherein the designated viseme is obtained from a memory by mapping a specified phoneme.

20. The method of claim 14, further comprising the step of:
    outputting the animated frame to a screen.

21. The method of claim 20, wherein both overlaying steps and said outputting step are performed in real-time on a computer.

22. The method of claim 14, further comprising the step of:
    outputting the animated frame to a file.

23. The method of claim 19, further comprising the step of synchronizing the frame with the specified phoneme.

24. The method of claim 14, further comprising the steps of:
    decomposing the one or more pictures into a group of parameterized facial parts with hair; and
    overlaying designated parameterized facial parts with hair onto the base face.

25. A method for generating an animated sequence of frames of photo-realistic faces, comprising the steps of:
    decomposing one or more pictures of a character into a plurality of parameterized facial parts, each parameterized facial part corresponding to a specific expression and each parameterized facial part comprising parameters in memory;
    loading from memory, for each of a plurality of desired facial expressions, a set of parameterized facial parts;
    overlaying, for each of the plurality of desired facial expressions, the set of parameterized facial parts onto a base face to form a whole face having the facial expression, wherein parameters of each parameterized facial part of the set are determined based on the desired facial expression; and
    overlaying, for each of the plurality of desired facial expressions, the whole face onto a background to form a sequence of animated frames.

26. The method of claim 25, further comprising the step of:
    synchronizing, using a speech synthesizer, each frame of the sequence with a phoneme corresponding to the facial expression used in the frame.

27. A method for generating an animated frame of a speaking photo-realistic face, comprising the steps of:
    obtaining from memory a viseme predetermined to correspond with a specified phoneme input;
    selecting from memory a set of one or more parameterized facial parts based on parameters corresponding to the viseme;
    overlaying the set of selected one or more parameterized facial parts onto a base face to form a whole face; and
    overlaying the whole face onto a background to form a frame.

28. The method of step 27, wherein the specified phoneme comprises the output of a text-to-speech synthesizer used to input text to be spoken concurrently with the animated frame.

29. The method according to claim 27, further comprising the step of:
    synchronizing the frame with a sound corresponding to the phoneme.

30. A method for generating a sequence of animated frames of photo-realistic characters, comprising the steps of
- decomposing one or more pictures of a face into parameterized facial parts comprising a plurality of distinct expressions;
- storing the plurality of parameterized facial parts into a memory;
- loading, for each of a plurality of frames, a designated set of parameterized facial parts from the memory;
- overlaying, for each of the plurality of frames, the designated parameterized facial parts onto a base face to form an animated image.

31. The method of claim 30, wherein said decomposing step comprises photographic extraction.

32. The method of claim 30, wherein said decomposing step comprises warping.

33. The method of claim 30, wherein
said loading and said overlaying steps are performed in real-time on a computer.

34. The method of claim 33, wherein the computer is a personal computer.

35. The method of claim 30, wherein each designated set of parameterized facial parts is determined based on a viseme.

36. A method for synthesizing an animated frame of a photo-realistic character, comprising the steps of:
- obtaining a viseme from memory based on a phoneme input;
- selecting one or more parameterized facial parts based on parameters corresponding to the viseme;
- calculating coarticulation effects based on the parameters corresponding to the viseme;
- producing modified parameters based at least on said calculating step;
- selecting modified parameterized facial parts based on the modified parameters; and
- generating an animated frame by overlaying facial parts onto a base face overlaid on a background image.

37. The method of claim 36, wherein said step of producing modified parameters is based on input comprising facial expression information.

38. A method for developing information to enable a program to generate an animated image comprising the steps of:
- defining a base face and storing the definition of said base face in a memory;
- decomposing said base face into facial parts;
- for at least one of said facial parts, developing a plurality of different realizations of said at least one of said facial parts, and storing said different realizations in said memory; where some of said different realizations of said at least one of said facial parts correspond to different visemes.

39. The method of claim 38 where some of said different realizations of said at least one of said facial parts correspond to different emotional expressions.

40. The method of claim 38 where said facial parts are parameterized, and the parameters are adapted for use in combining diverse facial parts into an image of a face.

41. A method for generating a sequence of animated frames comprising the steps of:
- identifying a phoneme to be synthesized;
- selecting from a memory a set of facial parts and their associated parameters, which facial parts combine to form a face image, where at least one of the facial parts that is selected for inclusion in said set is selected from a subset of like facial parts in said memory, based on said phoneme;
- retrieving from memory a base face definition; and
- overlaying said facial parts selected for said set onto said base face with the aid of said parameters.

* * * * *